April 10, 1951 L. W. WIGHTMAN 2,548,644
BEARING ASSEMBLY
Filed June 3, 1948
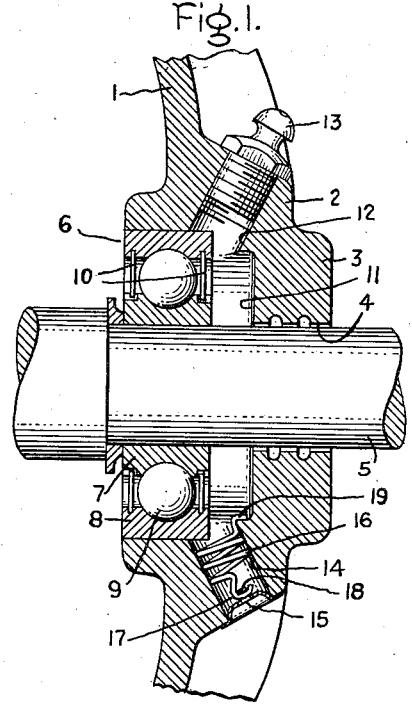
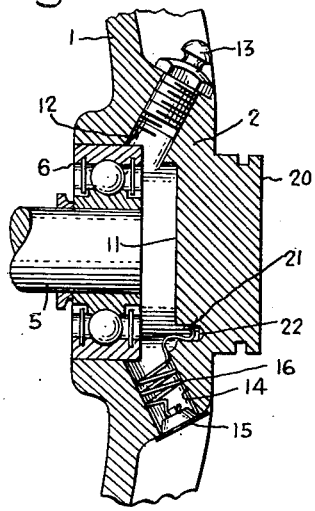
Inventor:
Lawrance W. Wightman,
by Purcell F. Mack
His Attorney.

Patented Apr. 10, 1951

2,548,644

UNITED STATES PATENT OFFICE 2,548,644

BEARING ASSEMBLY

Lawrance W. Wightman, Fort Wayne, Ind., assignor to General Electric Company, a corporation of New York Application June 3, 1948, Serial No. 30,890

6 Claims. (Cl. 308—187)

This invention relates to bearing assemblies and more particularly to ball bearing assemblies which are adapted to be grease packed.

In the design of rotating equipment, for instance, dynamo-electric machines which are to have ball bearings, it is customary to provide means for packing the bearing with grease. In such constructions, the grease is usually introduced into a grease retaining cavity through a pressure-type fitting by the use of a grease gun. The continued injection of grease into the bearing may build up an excessive pressure which, unless means are provided for the escape of the excess grease, will force the grease through the bearing. A pipe plug is usually provided which is removed when grease is being injected into the grease cavity. However, since failure to remove the plug may cause grease to be forced through the bearing, some form of pressure relief is desirable.

An object of this invention is to provide an improved bearing assembly.

Another object of this invention is to provide an improved grease packed bearing assembly having simplified grease escape means.

A further object of this invention is to provide an improved grease packed ball bearing assembly with pressure relief means for permitting the escape of excess grease.

Further objects and advantages of this invention will become apparent and the invention will be better understood from the following description referring to the accompanying drawing. The features of novelty which characterize this invention will be pointed out with particularity in the claims annexed to and forming a part of this specification.

In accordance with this invention there is provided a bearing housing having an end wall through which the shaft projects. A ball bearing is positioned in the housing and defines with the end wall a cavity to receive the grease packing. A grease escape passage connects the grease cavity to the exterior of the housing and is normally closed by a closure member held in place by a spring positioned in the grease escape passage. When the grease pressure within the cavity exceeds a predetermined amount, the spring is elongated allowing the closure member to open the grease escape passage thus permitting the excess grease to escape before it is forced through the bearing.

In the drawing Fig. 1 is a side elevational view, partly in section, illustrating the improved bearing assembly of this invention; Fig. 2 illustrates in detail the closure member and spring which constitute the improved grease relief of Fig. 1; and Fig. 3 illustrates a modification of this improved bearing assembly.

Referring now to Figs. 1 and 2, there is shown a ball bearing assembly of the type customarily employed on the end shields of dynamoelectric machines. Here, an end shield 1 is provided with a hollow bearing housing member 2 having an end wall 3 which is suitably apertured at 4 to receive the motor shaft extension 5. A ball bearing 6, which rotatably supports shaft 5, is positioned within the bearing housing member 2 and comprises an inner race 7 secured to the shaft 5, an outer race 8 tightly fitted in the bearing housing member 2, anti-friction elements or balls 9 interposed between the inner and outer races, and shield members 10. The ball bearing 6 defines with the end wall 3 of the ball bearing housing member 2 a grease retaining cavity 11. The bearing housing member 2 is provided with an opening 12 in its upper portion into the grease retaining cavity 11 through which the packing grease is introduced to the cavity. A pressure-type fitting 13 adapted for use with a grease gun may be conveniently inserted in the exterior opening of the grease introducing passage 12, however, any of the well known means for introducing grease may be utilized.

When grease is introduced to the grease retaining cavity 11 through the pressure fitting 13 by means of a grease gun or similar pressure device, the pressure of the grease within the cavity 11 may become sufficient to force the grease through the bearing shields 10 into the interior of the motor. In order to prevent excessive pressure forcing grease through the bearing, the arrangement now to be described is provided. A grease escape passage 14 is provided through the bearing housing member 2 from the grease retaining cavity 11. A closure member 15 is seated in the exterior opening of the grease escape passage 14 and is retained in position by a spring member 16. The spring 16 is positioned in the grease escape passage 14 and is held in tension between the closure member 15 and the inner surface of the grease retaining cavity 11, one end being formed into a hook 17 which is fastened to a corresponding hook 18 of closure member 15. The other end of the spring 16 is formed into a hook 19 which engages the inner wall of the grease retaining cavity 11. When the grease pressure in the cavity 11 exceeds a predetermined amount, the spring 16 will be elongated and the closure member 15 will open the grease escape passage 14 allowing the excess grease to escape before it is forced through the shields 10.

Referring now to Fig. 3, in which like parts are indicated by like reference numerals, there is shown a ball bearing assembly of the type used on end shields of dynamoelectric machines having no shaft extension projecting through the end shield. Here, end shield 1 has a hollow bearing housing member 2 with an end wall 20. The ball bearing 6 rotatably supports shaft 5 and is positioned in the cavity formed in the housing member 2. The ball bearing defines with the end wall 20 a grease retaining cavity 11 into which grease is introduced through opening 12, a pressure type fitting 13 being shown inserted in the opening. Closure member 15 is seated in the exterior opening of grease escape passage 14 and is held in position by spring member 16. The spring is provided with a hook portion 21 which is inserted in a drilled hole 22 in the inner surface of the end wall 20. The end of the hook portion 21 is wider in its unassembled position than the diameter of the hole 22 and thus, the end of the hook engages the wall of the hole due to the spring tension therein. Therefore, in this embodiment, the spring member 15 is held in place whether the bearing is in position or not.

It can be readily seen that the improved grease relief means of this invention will operate under a close light range of pressure. In the design of dynamoelectric machines, particularly in the fractional horse power frame sizes, the grease relief opening must be small and it is, therefore, desirable to use all of the opening area to produce the force which will open the closure member 15. Here, the closure member 15 is shown as being cup-shaped so that it can be positioned well within the external opening of the grease escape passage 14. However, when the grease pressure in the cavity 11 exceeds a predetermined amount, any slight deflection of the spring 16 permits grease to escape around the closure member 15. With this construction, the pressure relief assembly comprising the spring 16 and the closure member 15 can be readily inserted in the grease escape passage 14, and, once the bearing 6 is in place, the hook 19 cannot come loose from the inner wall of the cavity 11.

It can now be readily seen that there is here provided a simple and inexpensive grease relief suitable for small bearings which may replace the conventional pipe plug and prevent damage due to the grease being forced through the bearing.

What I claim as new and desire to secure by Letters Patent of the United States is:

1. In combination, a bearing housing having a grease retaining cavity formed therein and a grease escape passage formed in a wall thereof, means for introducing grease into said cavity, and pressure relief means disposed within said wall and actuated in response to excessive grease pressure in said cavity for allowing escape of said grease, said last mentioned means comprising, a closure member seated in the external opening of said passage, and a spring member in said passage and held in tension between said closure member and the inner opening of said passage for resiliently holding said closure member in said external opening for closing said passage against the escape of grease when said pressure is below a predetermined amount and for allowing said closure member to open said passage to permit the escape of said grease when said pressure exceeds said predetermined amount.

2. In combination, a bearing housing having a grease retaining cavity formed therein and a grease escape passage formed in a wall thereof, means for introducing grease into said cavity, and pressure relief means disposed within said wall and actuated in response to excessive grease pressure in said cavity for allowing escape of said grease, said last mentioned means comprising, a closure member seated in the external opening of said passage, and a spring member in said passage having one end engaging the inner surface of said cavity and the other end engaging said closure member for resiliently holding said closure member in said external opening for closing said passage against the escape of grease when said pressure is below a predetermined amount and for allowing said closure member to open said passage to permit the escape of said grease when said pressure exceeds said predetermined amount.

3. In combination, a bearing housing having an end wall apertured to receive a shaft, a bearing positioned in said housing and defining with said wall a grease retaining cavity, means for introducing grease into said cavity, said housing having a grease escape passage formed in a wall thereof, and pressure relief means disposed within said wall and actuated in response to excessive grease pressure in said cavity for allowing escape of said grease before it is forced through said bearing, said last-mentioned means comprising, a closure member seated in the external opening of said passage, and a spring member in said passage having one end engaging the inner surface of said cavity and the other end engaging said closure member for resiliently holding said closure member in said external opening for closing said passage against the escape of grease when said pressure is below a predetermined amount and for allowing said closure member to open said passage to permit the escape of said grease when said pressure exceeds said predetermined amount.

4. In combination, a bearing housing having an end wall apertured to receive a shaft, a ball bearing positioned in said housing and defining with said wall a grease retaining cavity, means for introducing grease into said cavity, said housing having a grease escape passage formed in a wall thereof, and pressure relief means disposed within said wall and actuated in response to excessive grease pressure in said cavity for allowing escape of said grease before it is forced through said bearing, said last-mentioned means comprising, a closure member seated in the external opening of said passage, and a spring member in said passage having one end engaging the inner surface of said cavity and the other end engaging said closure member for resiliently holding said closure member in said external opening for closing said passage against the escape of grease when said pressure is below a predetermined amount and for allowing said closure member to open said passage to permit the escape of said grease when said pressure exceeds said predetermined amount.

5. In combination, a bearing housing having an end wall apertured to receive a shaft, a ball bearing positioned in said housing and defining with said wall a grease retaining cavity, said housing having a grease escape passage formed in a wall thereof, and pressure relief means disposed within said wall and actuated in response to excessive grease pressure in said cavity for allowing escape of said grease before it is forced through said bearing, said last-mentioned means comprising, a closure member seated in the external opening of said passage, and a spring member in said passage having one end engaging the inner surface of said cavity and the other end engaging said closure member for resiliently holding said closure member in said external opening for closing said passage against the escape of grease when said pressure is below a predetermined amount and for allowing said closure member to open said passage to permit the escape of said grease when said pressure exceeds said predetermined amount.

6. A pressure relief device for a fluid containing chamber having a fluid escape passage formed in a wall thereof, said device being disposed within said wall and comprising a closure member seated in the external opening of said passage, and a spring member positioned in said passage having one end engaging the inner surface of said chamber and the other end engaging said closure member for resiliently holding said closure member in said external opening for closing said passage against the escape of fluid when the pressure in said chamber is below a predetermined amount and for allowing said chamber member to open said passage to permit the escape of said fluid when said pressure exceeds said predetermined amount.

LAWRANCE W. WIGHTMAN.

REFERENCES CITED

The following references are of record in the file of this patent:

UNITED STATES PATENTS

| Number | Name | Date |
|---|---|---|
| 1,823,422 | Bock | Sept. 15, 1931 |
| 1,954,685 | Stanton | Apr. 10, 1934 |
| 2,015,233 | Pfleger | Sept. 24, 1935 |
| 2,164,449 | Crow | July 4, 1939 |
| 2,283,871 | Morelius | May 19, 1942 |